United States Patent [19]
Verhagen

[11] Patent Number: 4,922,478
[45] Date of Patent: May 1, 1990

[54] DEVICE FOR SUPPORTING A SUB-FRAME OF A DISC RECORD PLAYER ON A FRAME, AND DISC RECORD PLAYER COMPRISING SUCH A DEVICE

[75] Inventor: Johannes P. C. M. Verhagen, Eindhoven, Netherlands

[73] Assignee: U.S. Philips Corporation, New York, N.Y.

[21] Appl. No.: 178,703

[22] Filed: Apr. 7, 1988

[30] Foreign Application Priority Data

Apr. 24, 1987 [NL] Netherlands ............... 8700969

[51] Int. Cl.⁵ .................................... G11B 25/04
[52] U.S. Cl. ......................... 369/247; 369/263
[58] Field of Search ................. 369/247, 263; 360/99.06

[56] References Cited

U.S. PATENT DOCUMENTS 4,387,453 6/1983 Zolt ........................... 369/263
4,719,526 1/1988 Okita et al. ............... 360/99.06
4,794,588 12/1988 Yoshitoshi et al. ......... 369/247
4,841,499 6/1989 Takahashi et al. .......... 369/263

Primary Examiner—Steven L. Stephan
Attorney, Agent, or Firm—John Francis Moran

[57] ABSTRACT

Supporting elements (10) arranged between the frame and the sub-frame (1) for damp vibrations or shocks exerted on the sub-frame via the frame. The sub-frame (1) carries part including a turn-table (3) and a pivotal scanning arm (4) with a scanning element (6). The supporting elements (10) are connected to the sub-frame (1) by means of pivotal joint (20), the pivotal axis (21) of said pivotal joints (20) extending radially or substantially radially of the moss center (M) of the sub-frame (1) including the parts carried by this sub-frame.

8 Claims, 4 Drawing Sheets

DEVICE FOR SUPPORTING A SUB-FRAME OF A DISC RECORD PLAYER ON A FRAME, AND DISC RECORD PLAYER COMPRISING SUCH A DEVICE

BACKGROUND OF THE INVENTION

The invention relates to a device for supporting a sub-frame of a disc-record player on a frame. Supporting elements arranged between the frame and the sub-frame for damp vibrations or shocks exerted on the sub-frame via the frame, the sub-frame carrying parts, including a turn-table and a scanning arm with a scanning element, which arm is pivotable about a pivotal axis.

Such a device is known and is employed in optical disc players of the Compact Disc type, intended for automotive and other mobile uses.

For example, while the vehicle is in motion such a player is subjected to forces having components in three directions of translation and three directions of rotation. The supporting elements of the device tend to damp all components to a certain extent, yet they must have a certain stiffness to support the sub-frame. During operation of the known player the disc is scanned by a scanning element on a pivotable scanning arm, the position of the scanning element relative to the disc being susceptible to be disturbed by shocks or vibrations, which result in a rotational force being exerted on the sub-frame via the frame and the supporting elements. This rotational force is directed in such a way that it gives rise to a pivotal movement of the scanning arm and thereby disturbs the tracking of the scanning element and hence the playing process.

A supporting device known from Patent Application WO-No. A1-86/02482 also has supporting elements which tend to damp movements of a sub-frame in the directions during vibrations or shocks. However, this known supporting device is employed in a disc record player comprising a translatable scanning element which is comparatively immune to rotational movements. This supporting device is not capable either of effectively eliminating the rotational forces.

SUMMARY OF THE INVENTION

The inventive device supports a sub-frame of a disc record player having a pivotal scanning arm, in such a way that an optimum isolation is obtained between the frame and the sub-frame for rotational forces exerted on the frame and acting about an axis parallel to the pivotal axis of the scanning arm.

The supporting elements are connected to the sub-frame by means of pivotal joints having pivotal axes oriented radially or substantially radially of the mass centre of the sub-frame including the parts carried by the sub-frame.

The sub-frame rotates relative to the frame within specific limits, about an axis through the mass centre of the sub-frame and parallel to the pivotal axis of the scanning arm. This is possible by pivotal movement of the supporting elements about the radially disposed pivotal connections. Thus, when rotational vibrations or shocks which act about the pivotal axis of the scanning arm are exerted on the frame, the original position of the sub-frame can be maintained to an optimum extent so that playing can proceed normally. This relative rotation between the frame and the sub-frame results in a rotational movement of the sub-frame within the housing. In practice, this does not present any problems because there is sufficient room inside the housing to allow such a rotational movement. This is in contradistinction to a translational movement of the sub-frame, which movement is susceptible to give rise to a collision of the sub-frame with adjacent parts inside the housing.

The device is very suitable for use in mobile disc record players in general and in optical disc players used in cars in particular, which during driving are frequently subjected to the said rotational vibrations or shocks.

A preferred embodiment of a device in accordance with the invention is characterized in that each supporting element comprises a tubular base connected to the frame and carrying a a rigid projection at its end which is remote from the frame, said projection being connected to the sub-frame by means of the pivotal connection near its end which is remote from the tubular base. Thus, the tubular base, which is suitably made of a vibration-damping material such as rubber, and the projection on the base enable a damping connection to be established between the frame and the sub-frame, which can be provided simply with a pivotal joint between the projection and the sub-frame at a distance from the tubular base. The bushing then does not obstruct the pivotal movement of the sub-frame. The projection is preferably a cylindrical spindle whose axis extends atleast substantially parallel to the pivotal axis of the scanning arm and intersects the pivotal axis of the pivotal joint at least substantially perpendicularly. The arrangement of the cylindrical spindle, which can be mounted simply on the tubular base, locally allows an effective pivotal movement of the sub-frame in such a way that the sub-frame performs an accurately defined rotational movement relative to the frame about an axis parallel to the pivotal axis of the scanning arm.

The pivotal axis of the pivotal joint is preferably situated near that side of a mounting plate of the sub-frame which faces the frame. Such an arrangement over the pivotal axis is important in view of the position of the mass centre of the sub-frame and provides adequate space between the sub-frame and the tubular base to allow the sub-frame to rotate.

The supporting element preferably further includes a helical spring which surrounds the tubular base and which at the side of the sub-frame acts against a spring seat which retains the helical spring at a level which relative to the pivotal axis is situated at theside opposite the side at which the mounting plate is situated. Thus, the device not only provides damping but also acts as a resilient supporting arrangement in which the spring seat retains the helical spring below the pivotal axis, so that the helical spring does not obstruct the pivotal movement.

A simple yet effective pivotal joint is obtained if the pivotal joint comprises a trunnion which is connected to the spindle and which at least over a part of its length is retained between the mounting plate and the spring seat secured to said plate. A pivotal joint which is entirely clear of the helical spring is obtained if the spring seat is mounted on the spindle and is connected to the mounting plate by means of the trunnion.

The invention also relates to a disc record player comprising such a device. A disc record player thus equipped is suitable for universal use, including mobile uses.

BRIEF DESCRIPTION OF THE DRAWINGS

Referring to FIG. 1, the disc-record player includes a sub-frame 1, on which the various parts of the disc player are mounted, and a frame 2, which is situated underneath said sub-frame, which frame is shown in FIGS. 2 and 3 and is not visible in FIG. 1 and which is mounted in a housing of the disc-record player in a manner not shown. Further details of such a disc record player are described and shown in the non-prepublished German Patent Application No. P 3643779.4, filed on 20 Dec. 1986 to which U.S. application Ser. No. 134,430 corresponds (herewith incorporate by reference).

In the present embodiment the disc-record player is constructed as an optical disc player intended for playing optical audio discs. However, it is to be noted that the present invention is not limited to such a disc record player but can also be used advantageously in optical disc players for other purposes and can also be used in players employing a conventional mechanical scanning system. The term "player" is to be understood to include apparatus for recording information on discs.

Figure 1:
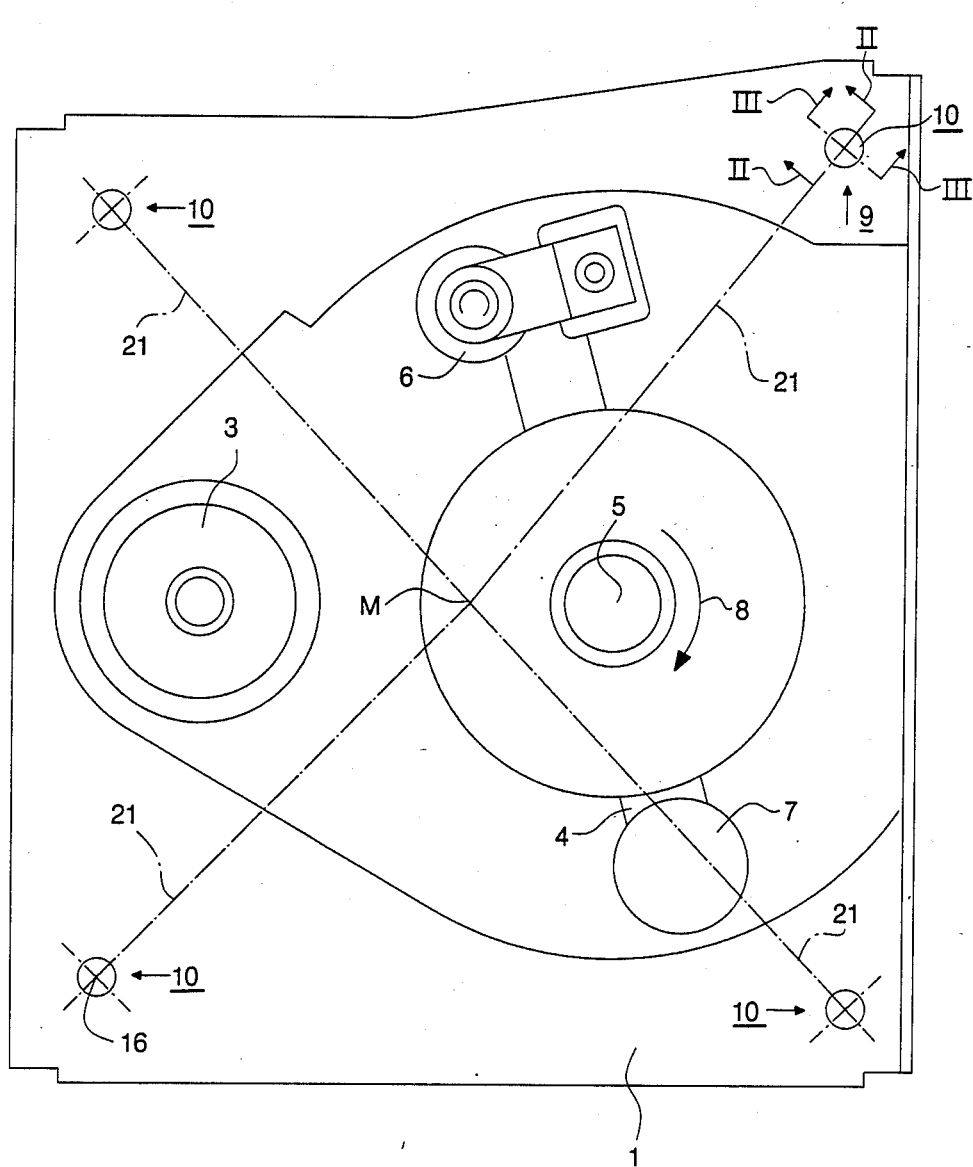
FIG. 1 is a schematic view of a disc record player having the device in accordance with the invention.

The sub-frame 1 of the disc record player carries a number of parts of which the principal parts are shown in FIG. 1. These include a turn-table 3, which is driven in a manner not shown by an electric motor underneath the sub-frame 1, and a scanning arm 4, which is pivotally mounted on the sub-frame 1, the pivotal spindle 5, represented diagrammatically in the Figure, extending perpendicularly to the sub-frame 1, which is constructed as a generally flat plate. The scanning arm 4 extends at opposite sides of the pivotal spindle 5 and near its first end which is remote from the pivotal spindle it carries an optical scanning element 6 and at its second end which is remote from the pivotal spindle 5 it carries a balancing weight 7. By means of the scanning element 6 the scanning arm 4 can scan an optical audio disc of the Compact Disc type, the arm 4 being pivoted about the pivotal spindle 5 during playing. During playing the scanning element is pivoted about the pivotal spindle 5 in the direction indicated by the arrow 8.

Figure 2:
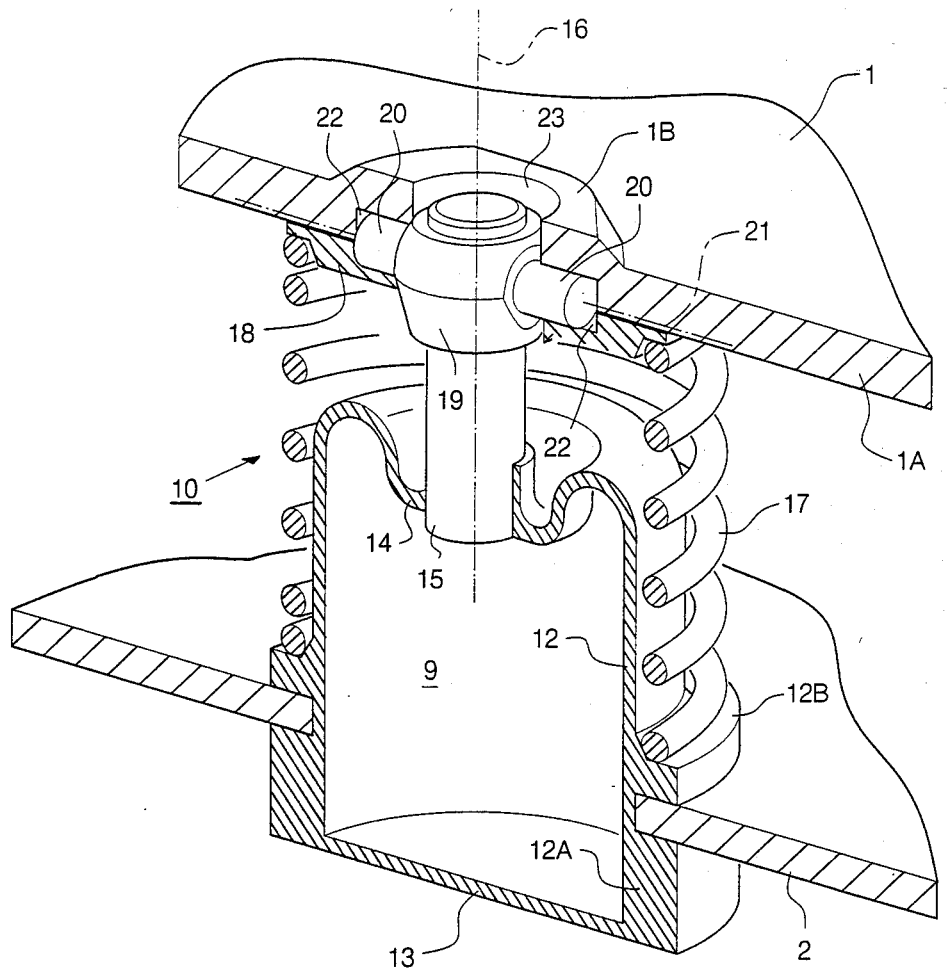
FIG. 2 is an enlarged-scale sectional view taken on the line II—II in FIG. 1, showing the device in detail.

A device 9 is arranged between the sub-frame 1 and the frame 2 to support the sub-frame 1 relative to the frame 2. The device 9 comprises a plurality of supporting elements 10, in the present case four, which are connected to the sub-frame 1 and the frame 2. It is to be noted that other numbers of supporting elements 10, for example 3, may be provided. The supporting elements 10 each comprise a tubular base 11, shown in FIGS. 2 and 3, made of a suitable elastic material such as an elastomer, which in the present embodiment comprises a circumferential wall 12 which is cylindrical in the non-loaded condition and which has a thicker portion 12A formed with a groove by means of which the base is clamped in the frame 2. A bottom 13 of the base adjoins the thicker portion 12A and is situated at the side of the frame 2 which is remote from the sub-frame 1. At the top the tubular base 11 has a curved upper wall 14 with a centre hole in which a rigid projection, constituted by a cylindrical spindle 15, is clamped. The spindle 15 is suitably fitted in the hole in the upper wall 14 by means of a so-called "insert moulding" technique, so that the spindle forms a unit with the base 11. The cylinder axis 16 of the spindle 15 coincides with the cylinder axis of circumferential wall 12 in the unloaded condition. It is to be noted that after the spindle 15 has been mounted the base 11 is fully closed and is filled with a suitable medium, such as a silicone oil. Further, it is to be noted that in an alternative embodiment, not shown, the circumferential wall 12 has a square cross section, the cylinder axis 16 of the spindle 15 being centred relative to the circumferential wall 12.

Figure 3:
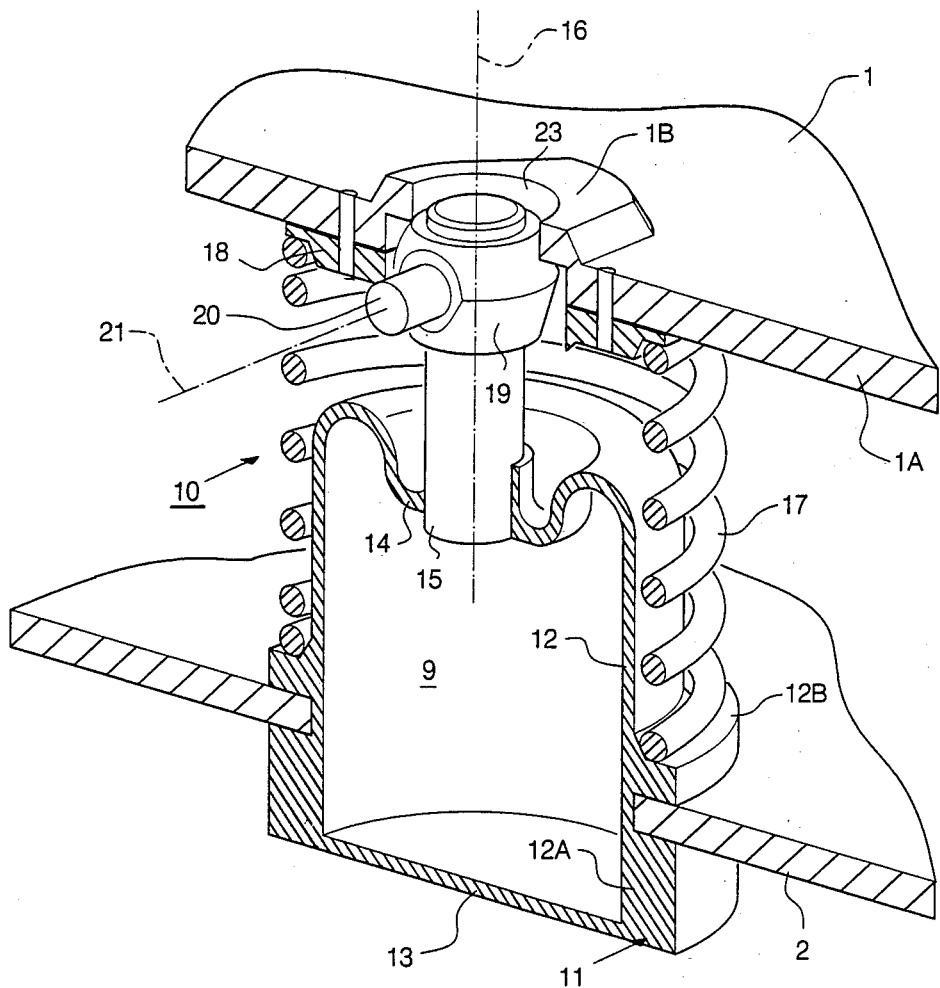
FIG. 3 is an enlarged scale sectional view taken on the line III—III in FIG. 1.

At the end of the thicker portion 12A the circumferential wall 12 comprises a flange 12B supporting an end turn 17 of a helical spring 17 whose other end acts against a spring seat 18 comprising a plate of circular circumference, connected to the under side of the sub-frame 1 in a suitable manner, for example by means of bolts as shown in FIG. 3. Thus, the base 11 and the helical spring 17 together support the sub-frame 1 relative to the frame, the helical spring and the base constituting a spring-damper system. The helical spring 17 serves for supporting the weight of the sub-frame and the record-player parts carried by said sub-frame and for resiliently damping movements of the sub-frame, whilst the tubualr base 11, as already stated, has a damping function which is enhanced by the curved shape of the upper wall 14. However, it is to be noted that in specific uses of the disc-record player by a suitable choice of the material of the base 11 the helical spring 17 may be dispensed with, so that the sub-frame 1 is supported only by the base 11. An annular member 19 is snapped onto the spindle 15 near its end which is remote from the base 11, which member is suitably made of a plastics. In the present embodiment the member 19 forms a unit with two trunnions 20 which project to opposite sides of the annular member, the axis 21 of said trunnions constituting a pivotal axis about which the sub-frame 1 can pivot relative to the supporting element 10 and the frame 2. As is shown in FIG. 1 the pivotal axis 21 may extend radially or substantially radially of the mass centre M of the sub-frame 1 together with the parts carried by the sub-frame, the mass centre being situated in the area between the pivotal axis 5 of the scanning arm 4 and the turn-table 3. The pivotal axis 21 is situated at the level of that side of a mounting plate 1A of the sub-frame which faces the the frame 2. Further, the pivotal axis 21 intersects the cylinder axis 16 of the spindle 15 at least substantially perpendicularly and the cylinder axis 16 extends at least substantially parallel to the pivotal axis 5.

The trunnions 20 engage in recesses which are bounded by the spring seat 18 at the lower side and by raised portions 1B of the mounting plate A at the upper side. At the level of the end of the spindle 15 the raised portion 1B has a recess 23 which continues into the spring seat 18 and which allows the spindle 15 together with the annular member 19 to perform a pivotal movement relative to the sub-frame 1 about the pivotal axis 21.

The device 9 in accordance with the invention in the disc record player shown in FIG. 1 enables the sub-frame and the record player part carried by said sub-frame to perform a pivotal movement about the pivotal axes 21 of the supporting elements 10. Since the pivotal axes 21 extend radially or substantially radially of the mass centre M the sub-frame 1 a relative rotational movement about an axis parallel to the pivotal axis 5 of the scanning arm 4 in the event that the frame 2 is subjected to vibrations or shocks. As a result of this, rotational forces to which the frame 2 is subjected for example, if such a disc record player is mounted in a vehicle, are suppressed to an optimum extent. The device 9 in accordance with the invention provides a comparatively compliant support for the sub-frame 1 in the said direction of rotation. In practice this means that if rotational forces are exerted on the frame 2 the scanning arm 4 will retain its original to an optimum extent. This is advantageous in order to ensure that a disc on the turn-table 3 can be scanned correctly by means of the scanning element 6. It is to be noted that it is advantageous that the supporting elements 10 effectively damp vibrations and shocks in directions other than said direction of rotation.

Figure 4:
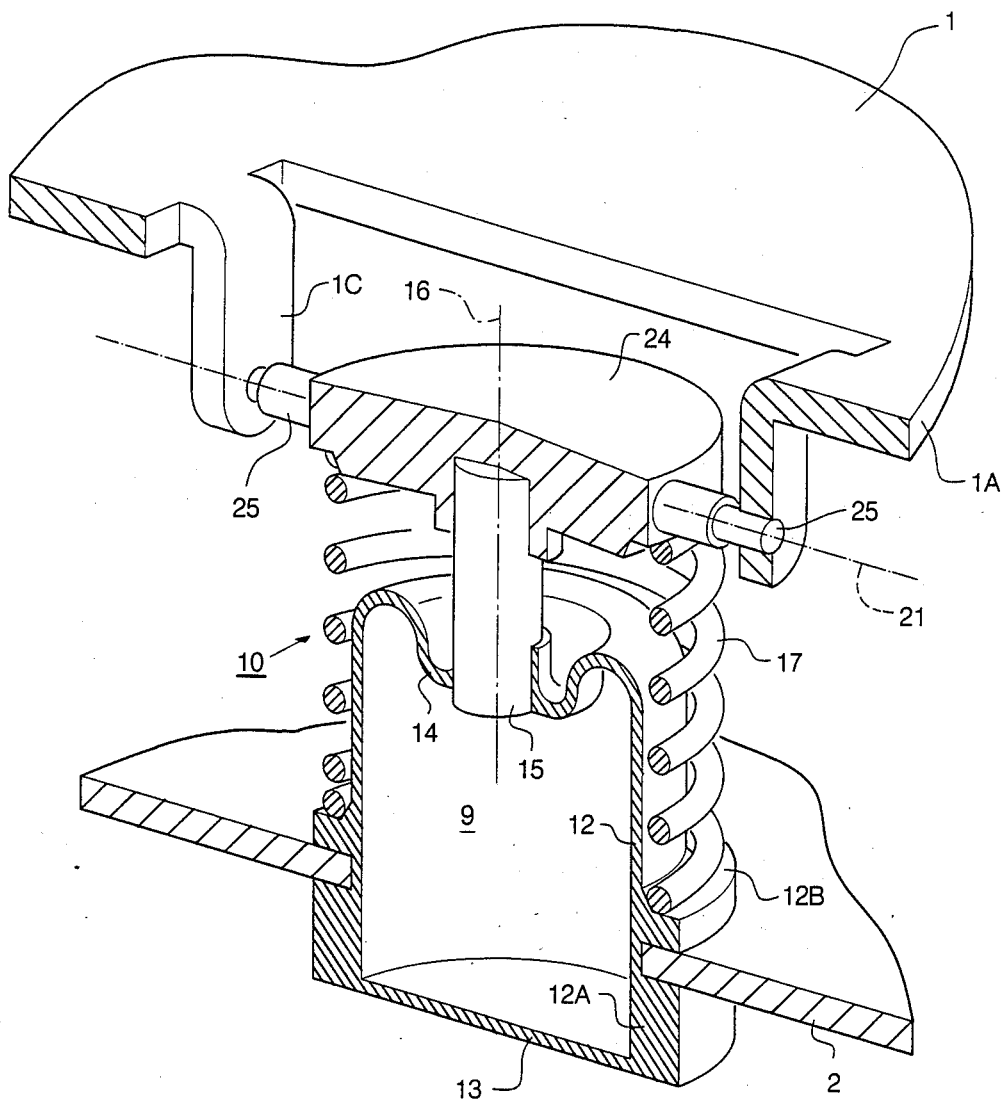
FIG. 4 is a sectional view similar to that shown in FIG. 2, showing a second embodiment of the device in accordance with the invention.

FIG. 4 shows an alternative embodiment in which corresponding parts bear the same reference numerals. In this embodiment the helical spring 17 is retained by a spring seat 24 which is mounted on a cylindrical spindle 15 and which forms a unit with the trunnions 25. These trunnions engage in holes formed in projecting tabs 1C on the mounting plate 1A. As a result of the arrangement of the trunnions 25 the pivotal axis 21 in the present embodiment is also situated near the under side of the mounting plate 1A. In this embodiment the pivotal movement about the pivotal axis 21 can be performed without being influenced by the helical spring 17, which is advantageous for an undisturbed pivotal movement. Further, it has the same advantages as the preceding embodiment.

It is to be noted that the device in accordance with the invention is suitable for use in mobile disc recor players, such as for example those used in vehicles or in portable equipment. The device in accordance with the invention is particularly suitable for use in optical disc-record players of the Compact Disc type used in cars.

What is claimed is:

1. A device for supporting a sub-frame (1) of a disc-record player on a frame (2), comprising a plurality of supporting elements (10) arranged between the frame and the sub-frame for damping vibrations or shocks exerted on the sub-frame via the frame, the sub-frame carrying parts, including a turn-table (3) and a scanning arm (4) with a scanning element (6), which arm is pivotable about a pivotal axis (5), characterized in that the supporting elements (10) are connected to the sub-frame by means of pivotal joints (20; 25), the pivotal axis (21) of said joints (20; 25) being oriented radially or substantially radially of the mass centre (M) of the sub-frame (1) including the parts carried by said sub-frame.

2. A device as claimed in claim 1, characterized in that each supporting element (10) comprises a tubular base (11), connected to the frame (2) and carrying a rigid projection (15) at its end which is remote from the frame, said projection being connected to the sub-frame (1) by means of the pivotal joint (20;25) near its end which is remote from the tubular base.

3. A device as claimed in claim 2, characterized in that the projection is a cylindrical spindle (15) whose axis (16) extends at least substantially parallel to the pivotal axis (5) of the scanning arm (4) and intersects the pivotal axis (21) of the pivotal joint (20; 25) at least substantially perpendicularly.

4. A device as claimed in claim 3, characterized in that the pivotal axis (21) of the pivotal joint (20; 25) is situated near that side of a mounting plate (1A) of the sub-frame (1) which faces the frame.

5. A device as claimed in claim 4, characterized in that the supporting element (10) further comprises a helical spring (17) which surrounds the tubular base (11) and which at the side of the sub-frame (1) acts against a spring seat (18; 24), which retains the helical spring (17) at a level which relative to the pivotal axis (21) is situated at the side opposite the side at which the mounting plate (1A) is situated.

6. A device as claimed in claim 5, characterized in that the pivotal joint comprises a trunnion (20) which is connected to the spindle (15) and which at least over a part of its length is retained between the mounting plate (1A) and the spring seat (18) secured to said plate.

7. A device as claimed in claim 5, characterized in that the spring seat (24) is mounted on the spindle (15) and is connected to the mounting plate (1A) by the trunnion (25).

8. A disc-record player, comprising a frame (2) and a sub-frame (1), which carries a turn-table (3) and a scanning arm (4) which is pivotable about a pivotal axis (5), which player is provided with a device (9) for supporting the sub-frame on the frame, said device comprising a plurality of supporting elements (10) arranged between the frame and the sub-frame for damping vibrations or shocks exerted on the sub-frame via the frame, the sub-frame carrying parts, including a turn-table (3) and a scanning arm (4) with a scanning element (6), which arm is pivotable about a pivotal axis (5), characterized in that the supporting elements (10) are connected to the sub-frame by means of pivotal joints (20; 25), the pivotal axis (21) of said joints (20; 25) being oriented radially or substantially radially of the mass centre (M) of the sub-frame (1) including the parts carried by said sub-frame.

* * * * *